INVENTOR.
ARTHUR H. McELROY
BY Head & Johnson
ATTORNEYS

INVENTOR.
ARTHUR H. McELROY
BY Head & Johnson
ATTORNEYS

INVENTOR.
ARTHUR H. McELROY

INVENTOR.
ARTHUR H. McELROY

BY Head & Johnson

ATTORNEYS

INVENTOR.
ARTHUR H. McELROY
BY
Head & Johnson
ATTORNEYS

United States Patent Office 3,371,544
Patented Mar. 5, 1968

3,371,544
APPARATUS AND METHOD FOR PERFORATING
BEVERAGE CASES OR THE LIKE
Arthur H. McElroy, 2789 E. 45th Place,
Tulsa, Okla. 74105
Filed Nov. 23, 1964, Ser. No. 413,241
1 Claim. (Cl. 74—86)

This invention relates to a method and apparatus for perforating articles. More particularly, this invention relates to methods and apparatus for forming a multiplicity of perforations or openings in the top and bottom of molded synthetic resin cases of the type used to carry beverage bottles, cans, or the like.

The beverage industry is currently providing a molded synthetic resin one piece case to replace the heretofore known wood multi-section cases used in transporting and handling beverage containers. It is found that successful economical, high strength cases, for example to carry twenty-four bottles, are best constructed by a blow-molding process which is well known to those skilled in the art. However, the process requires that the cases be perforated after molding not only for those openings which will receive the beverage containers, but also other alignment or drain openings as needed.

Accordingly, it is an object of this invention to provide a method and apparatus for perforating molded beverage cases or the like in an efficient and economical manner which overcomes the problem of forming blow-molded beverage cases.

It is another object of this invention to provide a method and apparatus for use in performing or forming openings in the upper and lower surfaces of beverage cases.

A still further object of this invention is to provide apparatus for causing said perforations or openings to be conducted in separate stages which stages or sections may be inserted, removed or added as required.

It is another object of this invention to provide a method and apparatus for perforating beverage cases or the like which includes a novel means for conveying said cases to the various stages and for actuating all of said stages simultaneously.

A yet further object of this invention is to provide an apparatus for sweeping and collecting the shavings and cuttings from the various perforation stages for reuse in the molding operation.

These and other objects of this invention will become more apparent upon further reading of the specification and claim when taken in conjunction with the following illustrations of which:

FIGURE 13 is a sectional view taken along the lines 13—13 of FIGURE 1 and depicts the typical stage or station C for perforating the bottom side of beverage cases to provide drain holes, weep holes or the like.

Description

Figure 1:
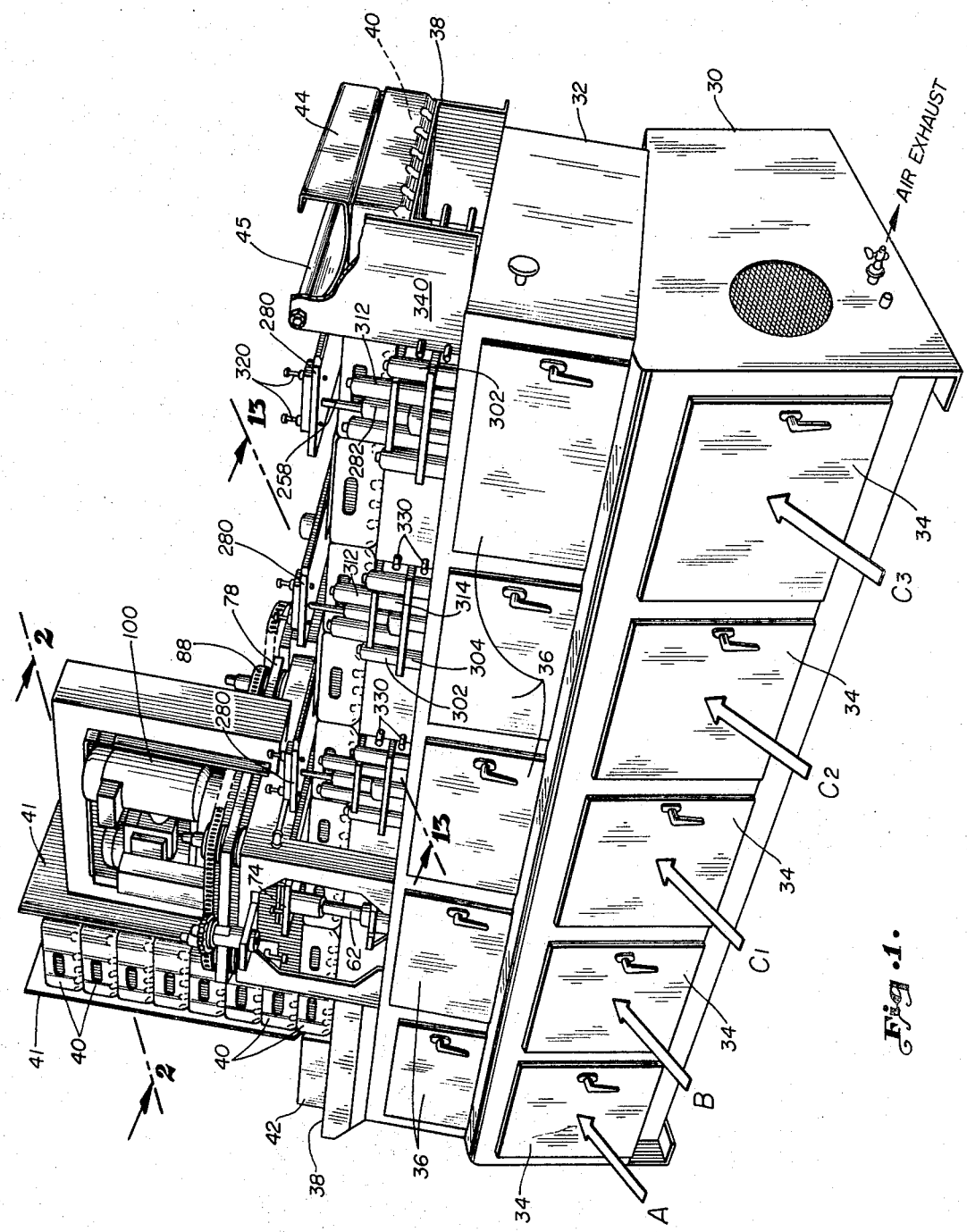
FIGURE 1 is a perspective view of the beverage case perforating apparatus of this invention.

Referring now to FIGURE 1, the overall combination of apparatus as taught in this invention is described.

Generally speaking, the apparatus is divided into three basic sections depicted by the arrows A, B, and C. Section A generally comprises the bottle case feeding, conveying and control mechanisms including electrical and pneumatic control portions. Section B comprises that equipment for perforating or routing a plurality of openings in the upper surface of the bottle case, whereas stations $C_1$, $C_2$, and $C_3$ are operative to produce perforations in the lower portion of the bottle case, as needed.

Each of the various sections generally includes a lower housing 30 and upper housing 32 which further include a plurality of access doors 34 for the lower housing and doors 36 for the upper housing. These doors provide immediate access or inspection of the various mechanisms of each section or stage without interference with the next adjacent stages. In fact, as assembled, it is possible to remove any one or more stages independently and replace same without a major interruption or disconnection with the rest of the apparatus.

A separate conveyor support plate is provided at each station and although vertically movable, as hereinafter described, the plates normally rest so as to be in a common conveyor plane 38 to permit the slide movement of beverage cases 40 from one station to the next. Preferably the conveyor plane is canted rearwardly and downwardly at an angle of approximately 15° from horizontal. It was found this assisted in the proper alignment of the beverage cases at each station and the removal of cuttings into a common collector.

The beverage cases 40 are stacked vertically in station A as shown and are adapted to drop one-by-one onto the conveyor support 38 upon return of the conveyor push mechanism 42.

At the end of the conveyor is an over-ride brake mechanism 44 which is pivoted about axis 45 to ride upon the top of the lastmost case 40. Additional weights can be supplied as desired to prevent the cases from over-riding the positional transfer at the start of each cycle.

Station B

Figure 2:
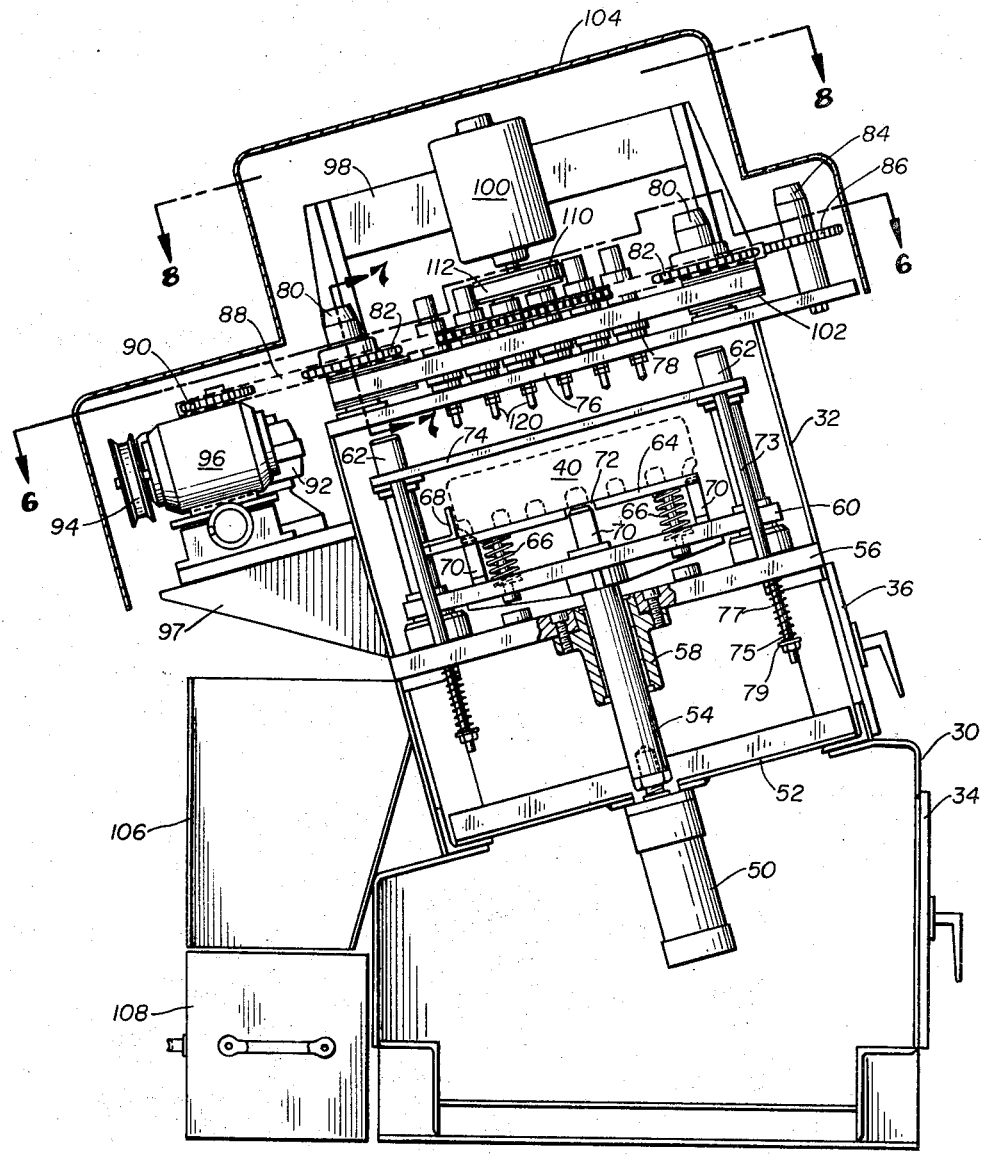
FIGURE 2 is a sectional view taken along the line 2—2 of FIGURE 1 which depicts mechanism of section B for causing upper beverage container openings.

Referring now to FIGURE 2 which is a sectional view taken along the line 2—2 of FIGURE 1 depicting station B which is adapted to route the larger diameter beverage container openings in the upper face thereof. A pneumatic cylinder 50 is attached to bracket 52. Attached to the movable piston of the air cylinder 50 is guide rod 54 which extends and moves upward through fixed base plate 56 supported by guide rod bearing and housing member 58. Indexing plate 60 is attached to the upper end of guide rod 54 and vertically movable with respect to guide posts 62. A conveyor plate 64 is supported to indexing plate 60 by coil springs 66 and vertically movable therewith. Guide rail 68 maintains the alignment of beverage case 40 along the conveyor plane 38.

Attached to indexing plate 60 are upwardly extending indexing horns 70 which are adapted to pass through appropriate recess openings 72 in conveyor plate 64. Preferably, the indexing horns are provided at each end and along each side and are adapted to engage indentations in the beverage case for proper alignment with respect to the routing or drilling apparatus.

An upper clamping plate 74 is provided above the beverage case with a guide bushing for vertical movement with respect to guide post 62. Plate 74 is supported by a spacer sleeve 73 to base plate 56. A spring bolt 75 is attached to plate 74 extending through sleeve 73 and plate 56 terminating its lower end with bolt and spring retainer means 79. Coil spring 77 normally maintains plate 74 against spacer sleeve 73 but permits movement upwardly against the spring.

Terminating the upper end of the upper housing 32 is router mounting plate 76. Attached to the router mounting plate are four vertically extending corner sprocket shafts 80 for rotatably supporting sprockets 82. Idler shaft 84 is adjustably attached to router mounting plates 76 for taking up any slack in the chain member 88. The endless chain 88 extends around sprockets 82 and sprocket 90 which is the output of gear reducer 92. Gear reducer 92 is driven by a belt and pulley system 94 powered by electric motor 96.

A mounting plate or bracket 98 is attached to router orbiting plate 78 to receive electric motors 100 for rotating the routers used in section B. Associated with each shaft and sprocket members 80 and supporting router orbiting plate 78 are eccentrics 102, more specifically described in FIGURE 7.

Covering the router drive mechanism is a housing or guard 104. The router orbiting plate gear reducer 92 and drive motor 96 are adjustably mounted upon a support bracket 97 which includes not only means to regulate the tension of the pulley and belt system 94 but also means well known to those skilled in the art for regulating the drive speed.

At the rear of the upper and lower housing is a scrap diversion funnel 106 below which is a collection bin 108. The scrap diversion funnel extends across the back and collects scrap from all stations for diversion into collection bin 108.

Figure 3:
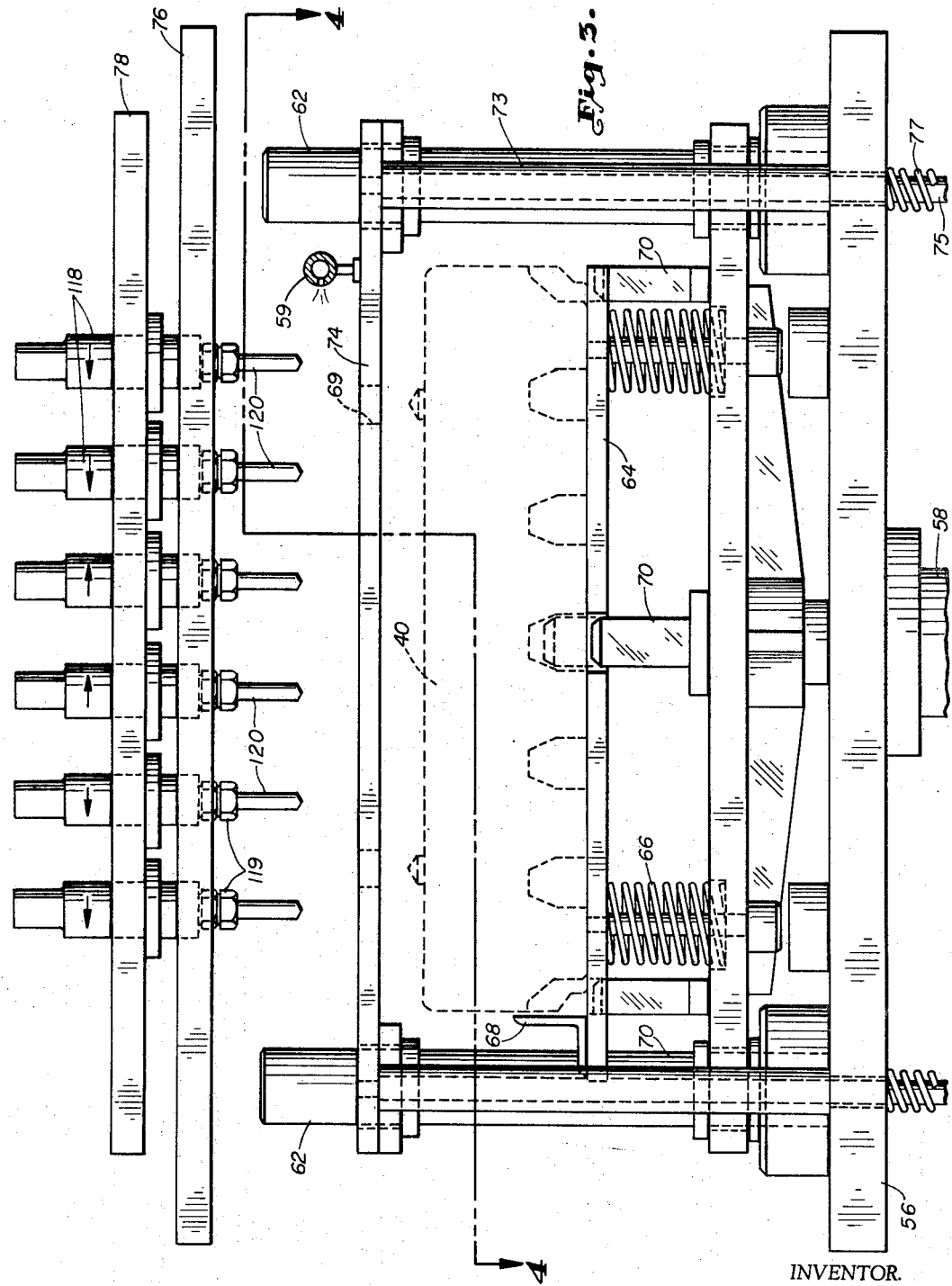
FIGURE 3 is an elevational view of the indexing and clamping mechanism used in section or stage B to perforate the upper beverage container openings.
Figure 4:
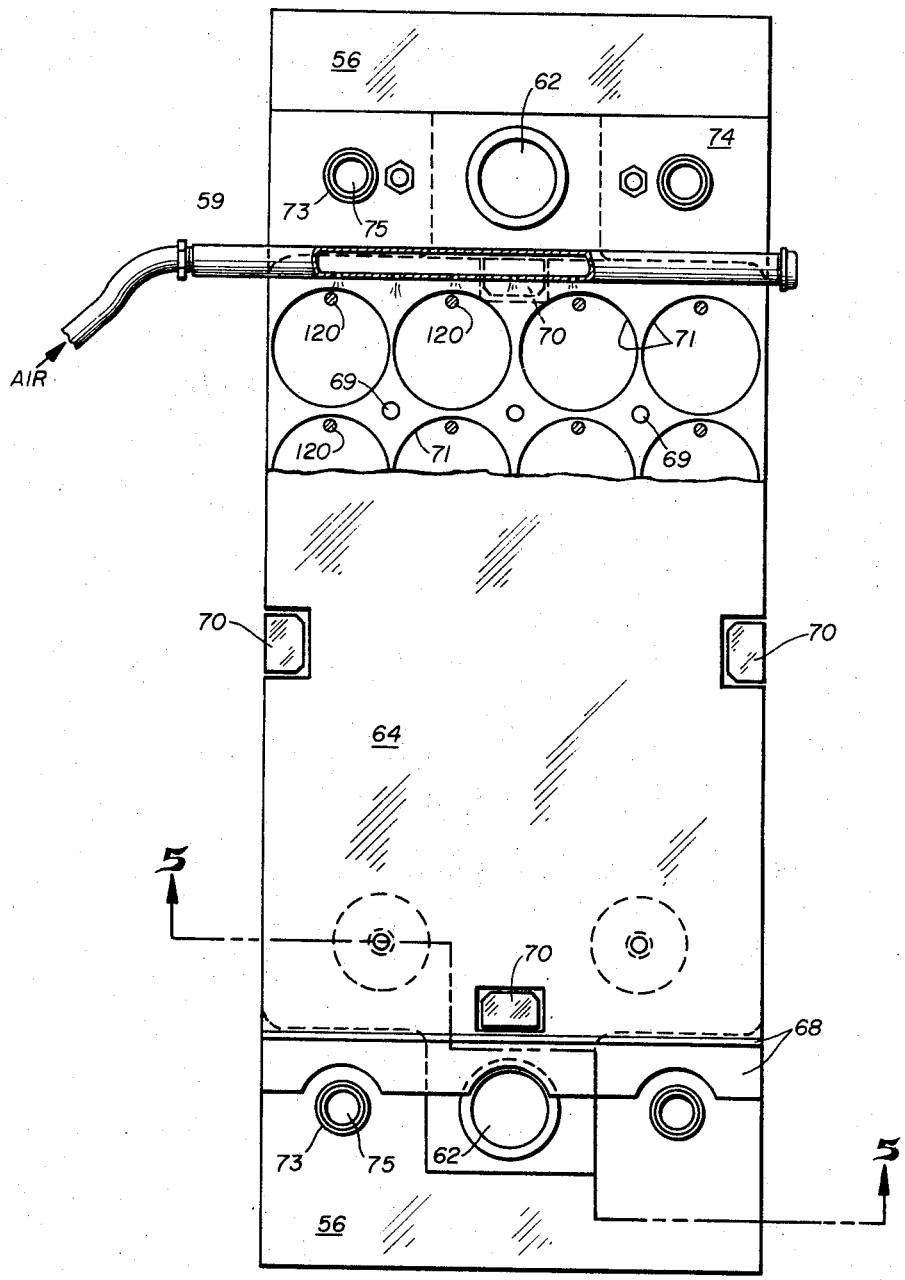
FIGURE 4 is a sectional view taken along the line 4—4 of FIGURE 3.
Figure 5:
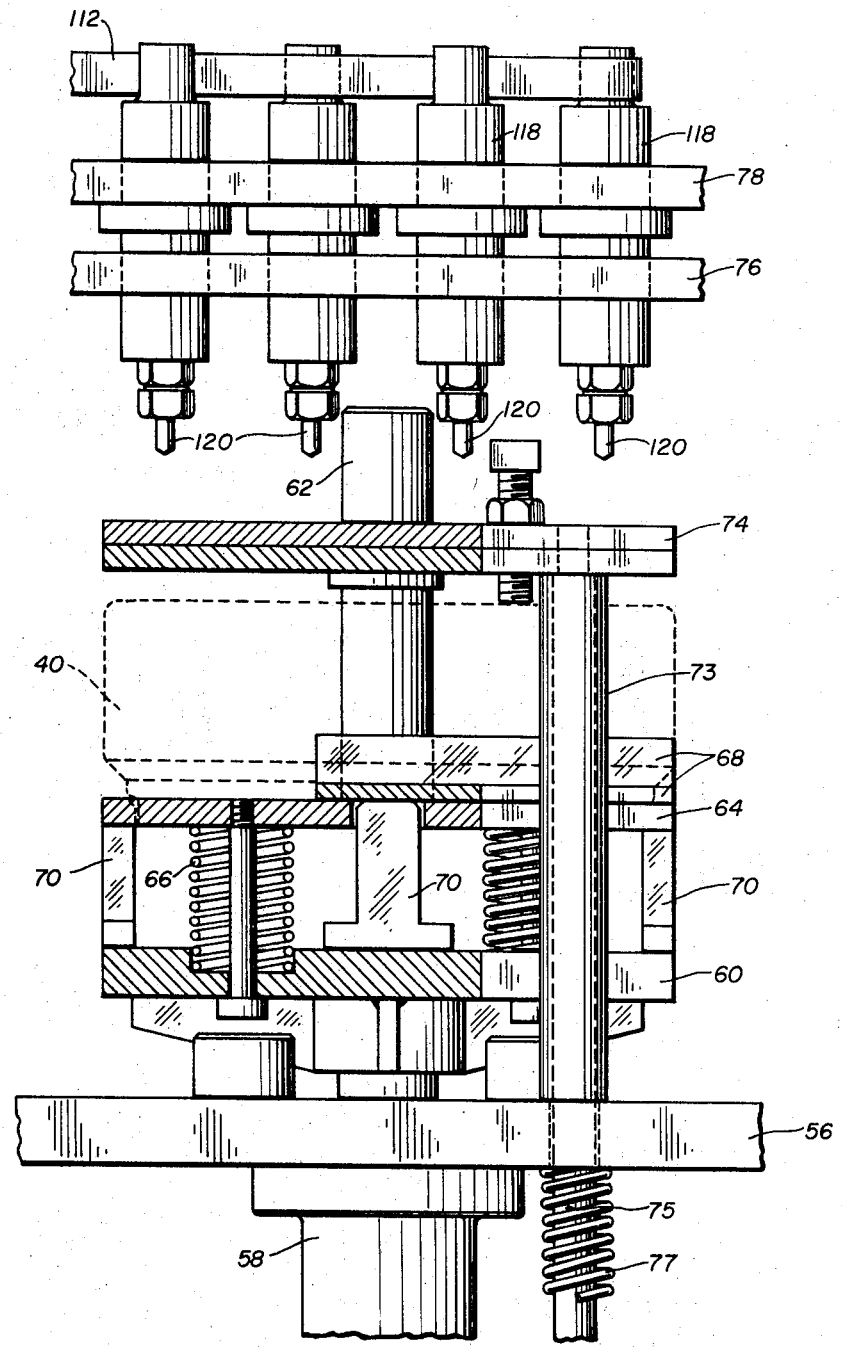
FIGURE 5 is a view taken along the line 5—5 of FIGURE 4.

FIGURES 3 and 4 and 5 provide additional details of construction of station B. Specifically, clamping plate 74 is shown with openings 71 which are slightly larger than the oscillatory orbit of routers 120. Index openings 69 are adapted to receive a protrusion of the beverage case 40. Spindles 118 are flange mounted to orbiting plate 78 terminating with an integral collet 119 for routers 120. Air supply conduit 59 is attached to clamping plate 74 to assist in the removal of cuttings toward the rear of the station.

Figure 6:
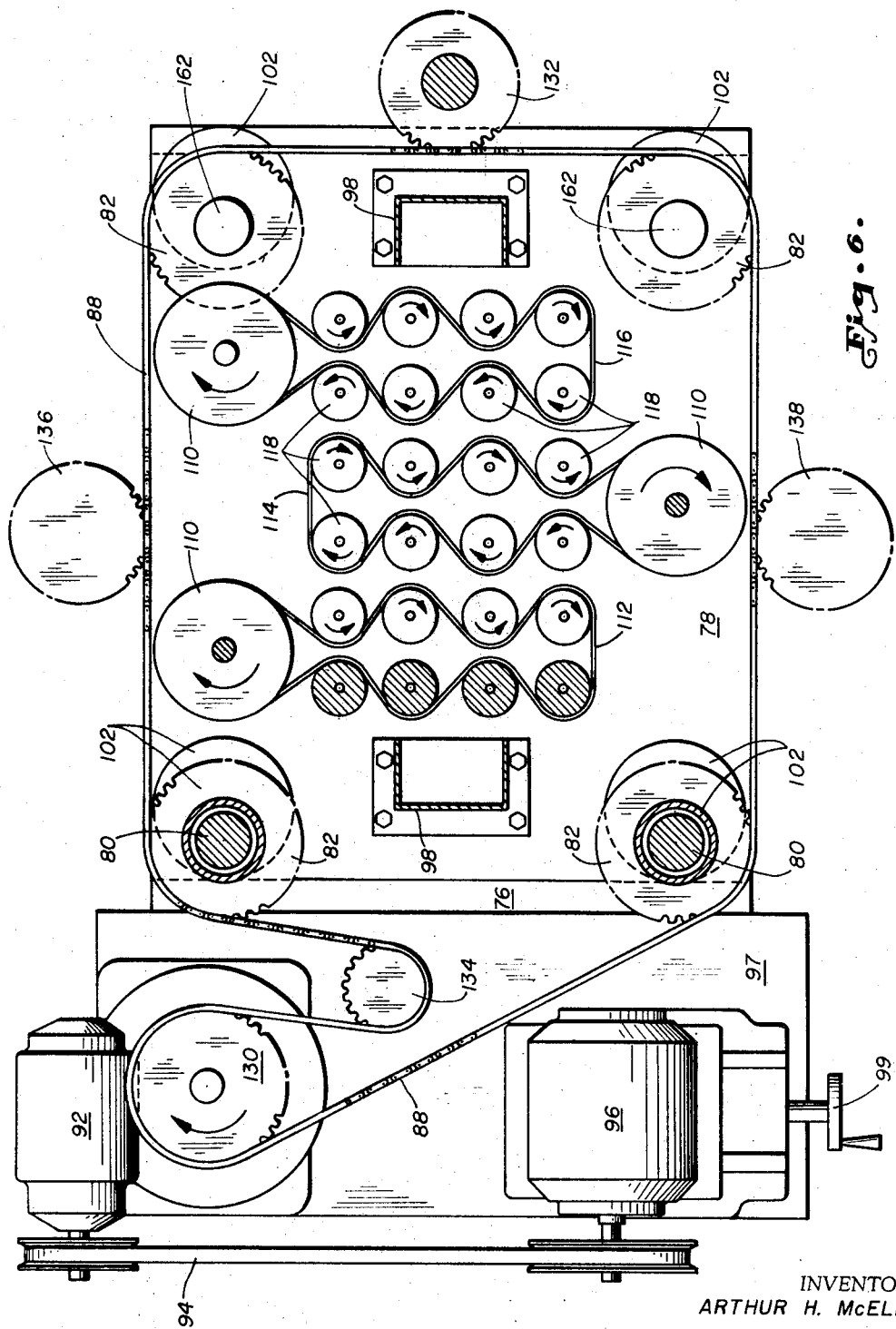
FIGURE 6 is a sectional view of the outer drive mechanism taken along the line 6—6 of FIGURE 2.

Referring now to FIGURE 6, the router orbiting plate 78 is depicted in top elevation. Support bracket 97 is adapted to retain electric motor 96 and gear reducer 92. The drive belt and pulley system generally designated by the numeral 94 includes means 99 to move the motor and hence change the sheave diameter to vary the speed as is well known to those skilled in the art. An output sprocket 130 of gear reducer 92 drives link chain 88 to rotate sprockets 82 with respect to fixed spindles 80 which in turn are affixed to router mounting plate 76. Each of the sprockets 82, in turn, are keyed to an eccentric sleeve 102, the details of which are more fully described in FIGURE 7. The chain drive stystem is further provided with a front and rear idler sprockets 132 and 134 and side idler sprockets 136 and 138. Spindle drive motor mounting bracket 98 is adapted to retain electric motors 100 as best shown in FIGURE 8. The output of each motor includes flat belt drive pulley 110 for driving respectively the three endless flat belts 112, 114 and 116 which drive router spindles 118. As observed, this will require that some of the routers will be of a left hand cut and others a right hand cut.

Figure 7:
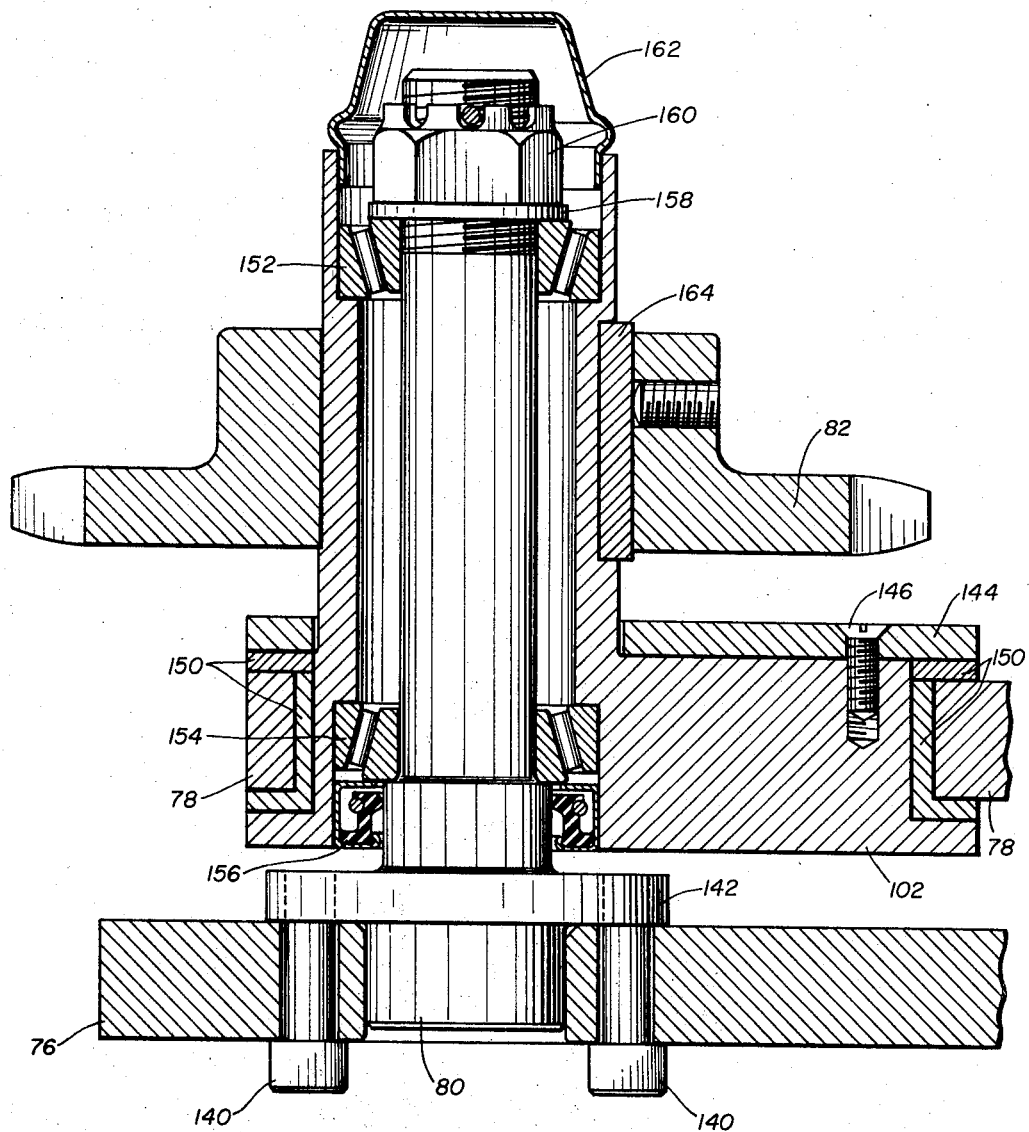
FIGURE 7 is a sectional view taken along the line 7—7 of FIGURE 2.
Figure 8:
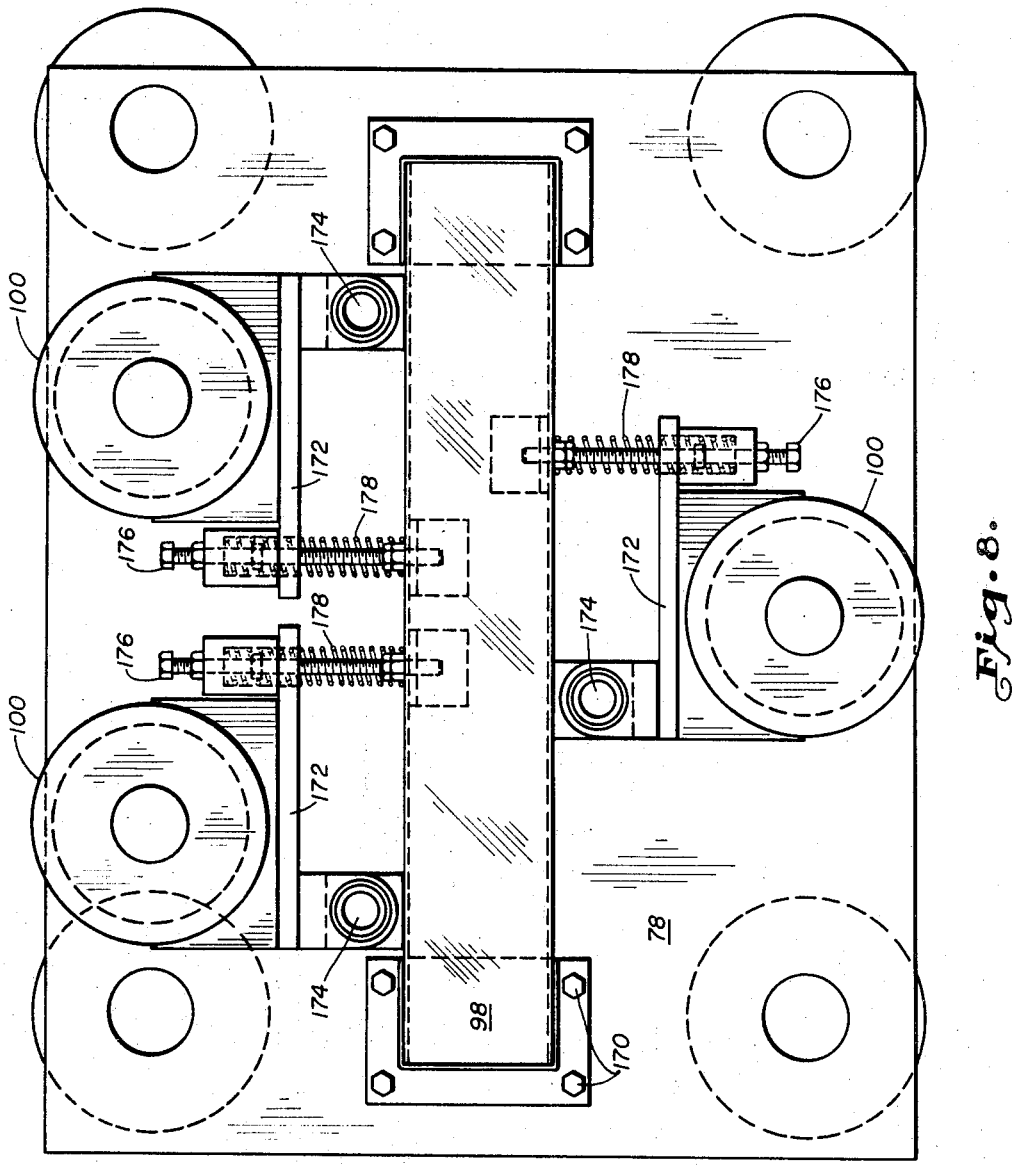
FIGURE 8 is a top plan view of the router drive motor mounting system as taken along the line 8—8 of FIGURE 2.
Figure 9:
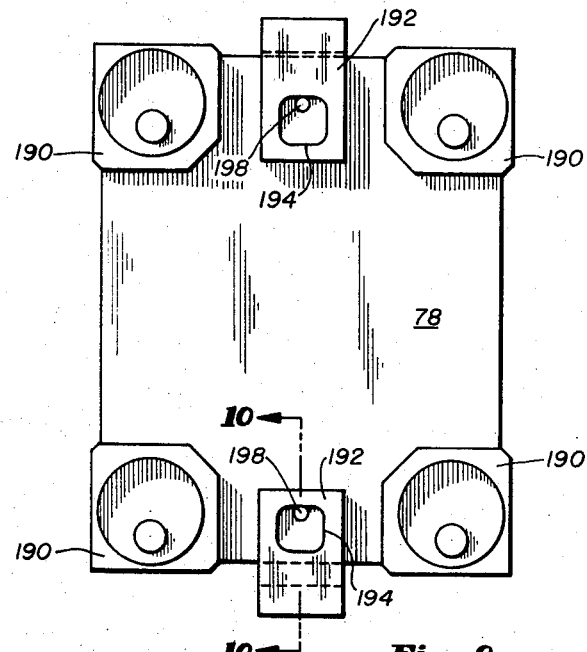
FIGURE 9 is a top layout view of an alternate embodiment of this invention.
Figure 10:
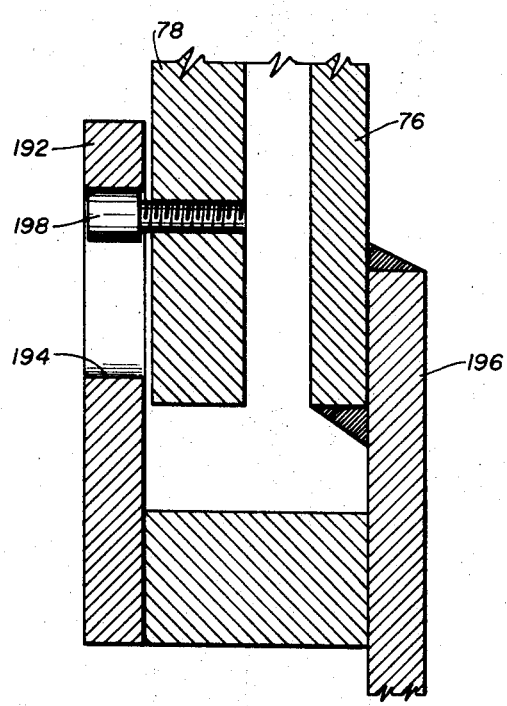
FIGURE 10 is a sectional view taken along the line 10—10 of FIGURE 9.

Referring now to FIGURE 7, spindle 80 is affixed to router mounting plate 76 by fasteners 140 which are threaded to a flange portion 142 of spindle 80. Eccentric sleeve 102 includes a cap portion 144 which is fastened to the main body of eccentric 102 by a multiplicity of fasteners 146. The eccentric 102 and cap portion 144 are supported with respect to the router orbiting plate 78 by slide bearings 150.

The main body of eccentric 102 is supported about spindle 80 by upper and lower bearings 152 and 154 respectively with a seal 156 at the lower end thereof which are retained in their respective positions by washer 158 and lock nut 160. A protective dust cap 162 is retained on the eccentric 102 and is rotatable therewith. Sprocket 82 is attached to eccentric sleeve 102 by means of a keyway and key 164.

Referring now to FIGURE 8, the motor mounting 98 which is attached to router orbiting plate 78 by bolts 170 is adapted to receive motors 100 for driving the router spindles 118, previously described. Each motor is mounted upon a vertical plate 172 which is pivotal about shafts 174. Adjusting bolts 176 extend horizontally into an opening provided in mount 98. Springs 178 are adapted to normally maintain tension on the motors and hence belts 112, 114 and 116 as adjusted.

FIGURES 9, 10, 11 and 12 describe an alternate embodiment of this invention for causing the router orbiting plate 78 to transcribe an orbit for an opening of any predetermined shape, from round to substantially rectangular or square. In this instance, the router orbiting plate 78 will be modified to include an adjustable eccentric means 190 at each corner thereof. At the front and rear respectively are tracing cams 192, the opening 194 of which describes the desired opening to be formed by the routers, not shown in these views. The tracing cam is attached or affixed to the orbit mounting plate 76 or extensions thereof 196 as needed. Attached to the router orbiting plate 78 is tracing cam follower 198 which traces the predetermined opening 194 and hence causes router orbiting plate 78 to orbit according to the shape of the predetermined tracing opening 194. It is within the scope of this invention that these parts can be reversed, i.e., tracing cam or opening 194 on plate 192 is affixed to router orbiting plate 78 relative to a follower 198 affixed to mounting plate 76.

Figure 11:
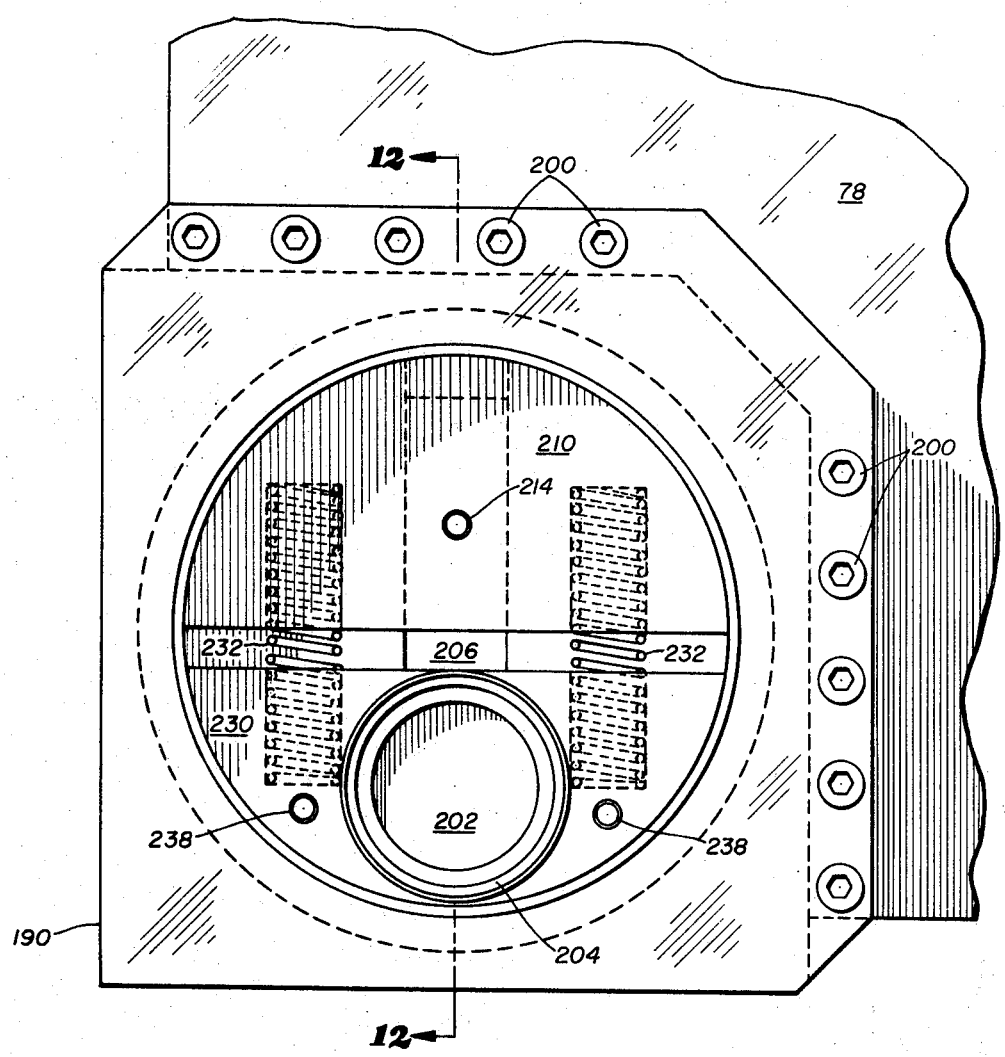
FIGURE 11 is an enlarged partial top view of said alternate embodiment.
Figure 12:
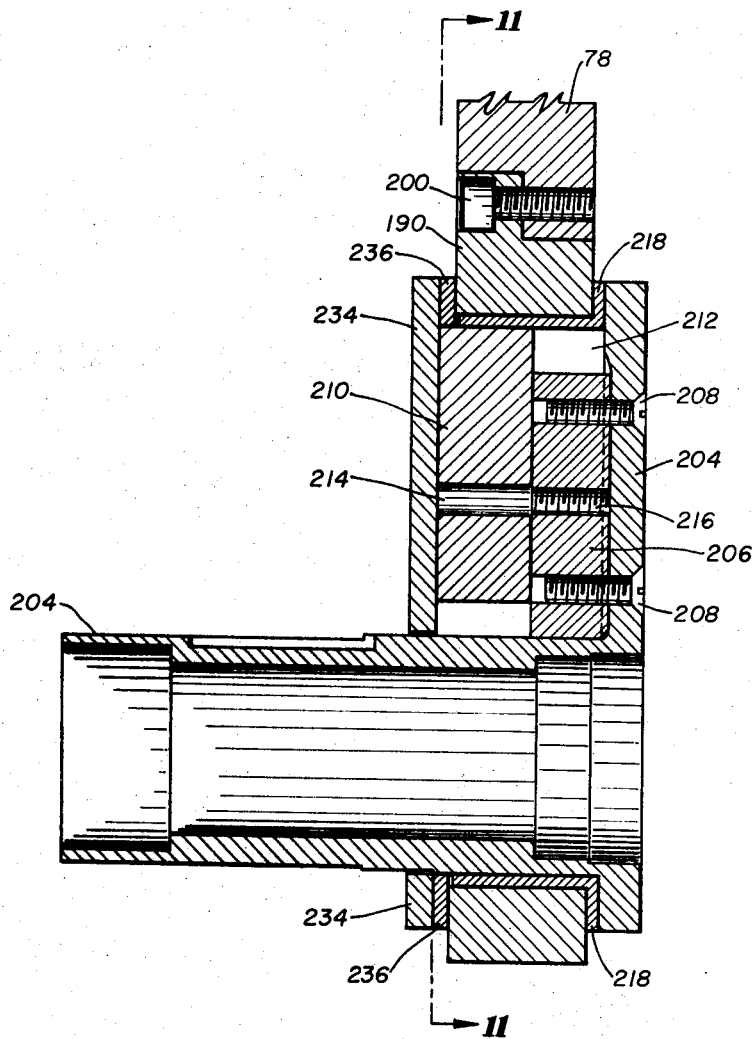
FIGURE 12 is a sectional view taken along the line 12—12 of FIGURE 11.

Referring now to FIGURES 11 and 12, the adjustable eccentric 190 is attached to the router orbiting plate 78 by means of fasteners 200. Spindle 202 is affixed to the router mounting plate 76 in a manner previously described. Eccentric sleeve 204 is rotatably supported by bearings and suitable packing and sealing devices to the spindle, as in FIGURE 7, and not shown in these views. Guide member 206 is attached to the eccentric 204 by means of fasteners 208. Cam shoe 210 includes a slot 212 which drops over guide rail 206 and permits slidable movement with respect thereto. In the event it is desired to lock cam shoe 210 with respect to the eccentric in a given position, a lock screw can be inserted within opening 214 for attachment with the threaded portion 216 of guide rail 206. Bearing 218, of the type sold under the trademark "Oilite," is used between the insert 190 and the cam shoe 210 and eccentric 204 to reduce friction and wear.

A portion of eccentric 214 includes cam shoe 230 which is fixed relative to sleeve 204. Opposed openings in movable cam shoe 210 and fixed cam 230 are adapted to receive springs 232 which tend to normally bias the movable cam shoe 210 away from the fixed cam 230. A cover 234 and bearing 236 is attached to the fixed cam shoe 230 using the threaded openings 238 as provided. A sprocket, not shown, is keyed to eccentric 204 as previously described in FIGURE 7 in order to cause rotation thereof.

In operation of this embodiment, an endless link chain is attached around each of the sprockets at the four corners of the router orbiting plate 78. Upon movement, the router orbiting plate will begin its orbital movement but limited thereto by the action of cam follower 198 against the desired tracing opening 194, requiring as such "give and take" in the eccentric by the movement of cam shoe 210 against the springs 232 with respect to the fixed cam shoe 230. Hence, the device is capable of describing any desired tracing orbit, whether round, elliptical, rectangular or square.

*Station C*

Figure 13:
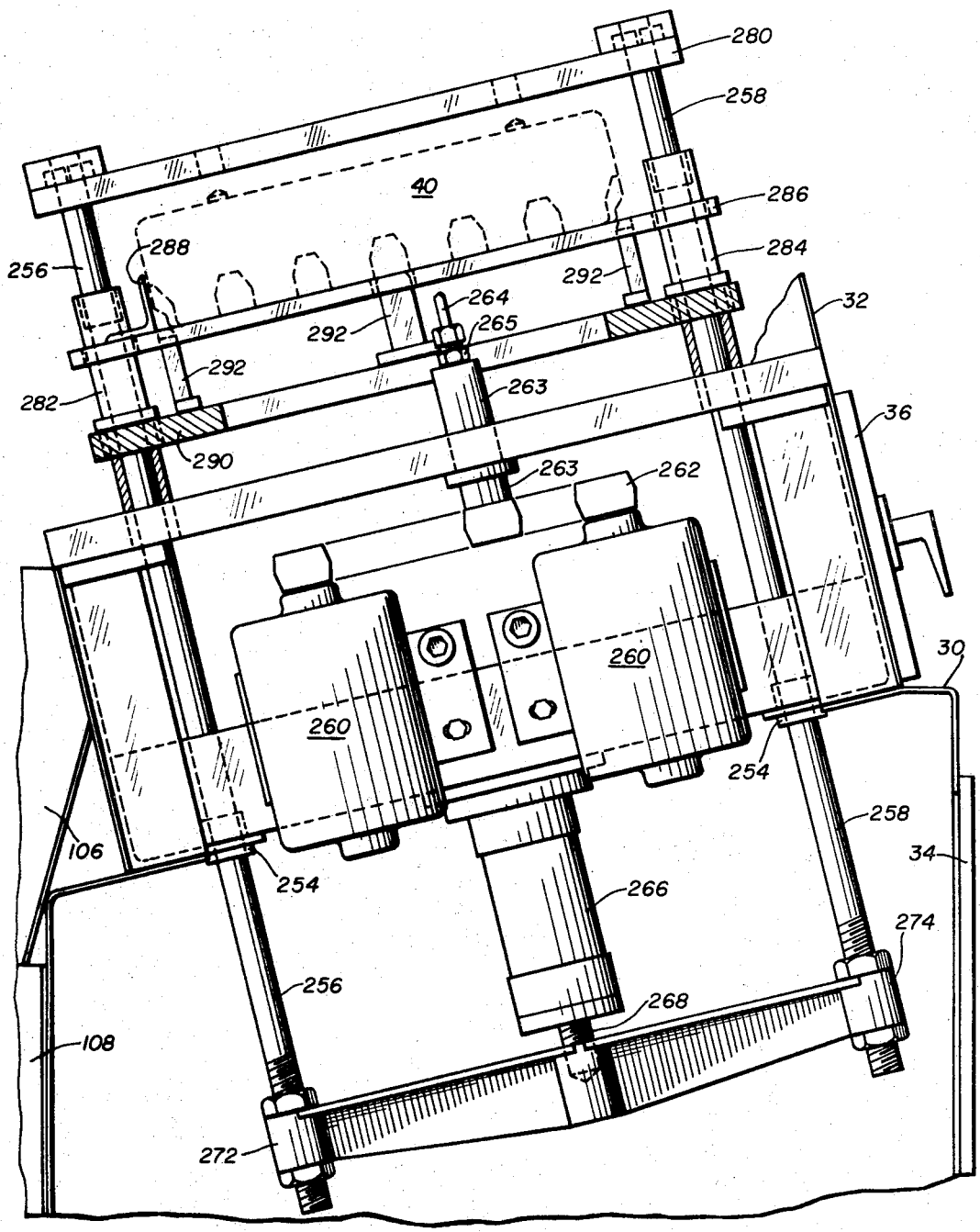

Referring now to FIGURE 13 which is deemed typical of stations $C_1$, $C_2$, and $C_3$, the differences being the size of drills and their location with respect to the beverage case 40, otherwise the components are substantially identical. The numeral 250 refers to the base plate which is supported to the upper housing frame 32. Air cylinder bracket 252 is attached thereto and extends in part across the central portion from front to rear and provided with guide bushings 254 for clamp rod 256 and 258. Motors 260 are pivotally adjustable with respect to another portion of bracket 252 similarly to that shown in FIGURE 8, each motor including a pulley and belt system 262 to drive drill spindles 263 to which drills 264 extend upwardly as shown. Drill collet 265 is a part of each spindle to hold drills 264. Air cylinder 266 is attached to the bracket 252 centrally from which piston rod 268 extends at the lower end, being attached to clamp yoke 270. At each end of the clamp yoke is adjustable locking means 272 and 274 for respective vertical clamp rods 256 and 258.

Figure 14:
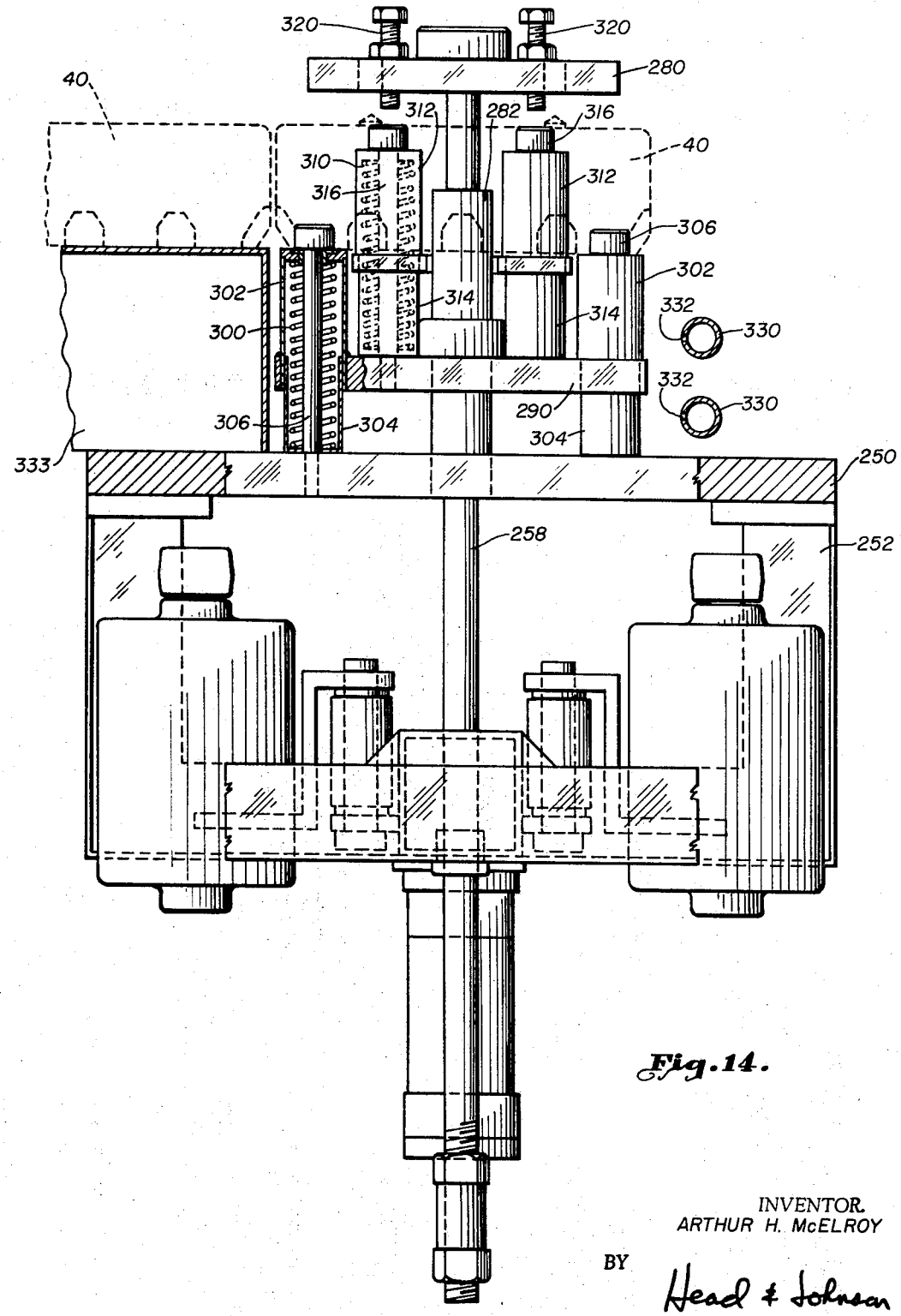
FIGURE 14 is a front partially sectional view of station C as shown in FIGURE 13.

The upper end of clamp rods 256 and 258 is attached to a clamp plate 280. The clamp rods are vertically movable through respective guide sleeves 282 and 284 with bushings being provided as needed. The clamp plate 280 is movable with guide rods 256 and 258 downwardly towards the beverage case 40 which is at rest upon conveyor plate 286, the rearward portion of which includes a guide rail 288. Conveyor plate 286 includes openings therein appropriately located opposite each drill and slightly larger thereof. An indexing plate 290 is adapted to support indexing horns 292 both front and rear and on the two sides with respect to the beverage case 40 as positioned on conveyor plate 286. As more aptly shown in FIGURE 14, indexing plate 290 is supported at the front and rear by the spring 300 which is housed by upper member 302 which is rigidly attached to the indexing plate 290 and telescopically movable with respect to the lower housing 304 which is retained to the base plate 250 by the shoulder on bolt 306. Similarly, conveyor plate 286 is supported to indexing plate 290 by spring 210 which is housed by upper member 312 attached to the conveyor plate 286 and telescopically movable about lower housing 314 which is retained to indexing plate 290 by a bolt 316 threaded into the indexing plate as shown. In addition, clamp plate 280 includes limit screws or bolts 320, the ends of which are adapted to abutt the top of bolts 316 and likewise adjust the clamping pressure as plate 280 moves into engagement with the beverage case 40 during the operation which is explained hereafter.

At each section, air supply conduits 330 are located preferably above and below indexing plate 290 extending parallel therewith from front to rear and including a plurality of air jets 332. This assists in removing cuttings and shavings which are directed across the plate against baffle 333 falling to the rear of the section into common collection bin 108.

*Operation*

Figure 15:
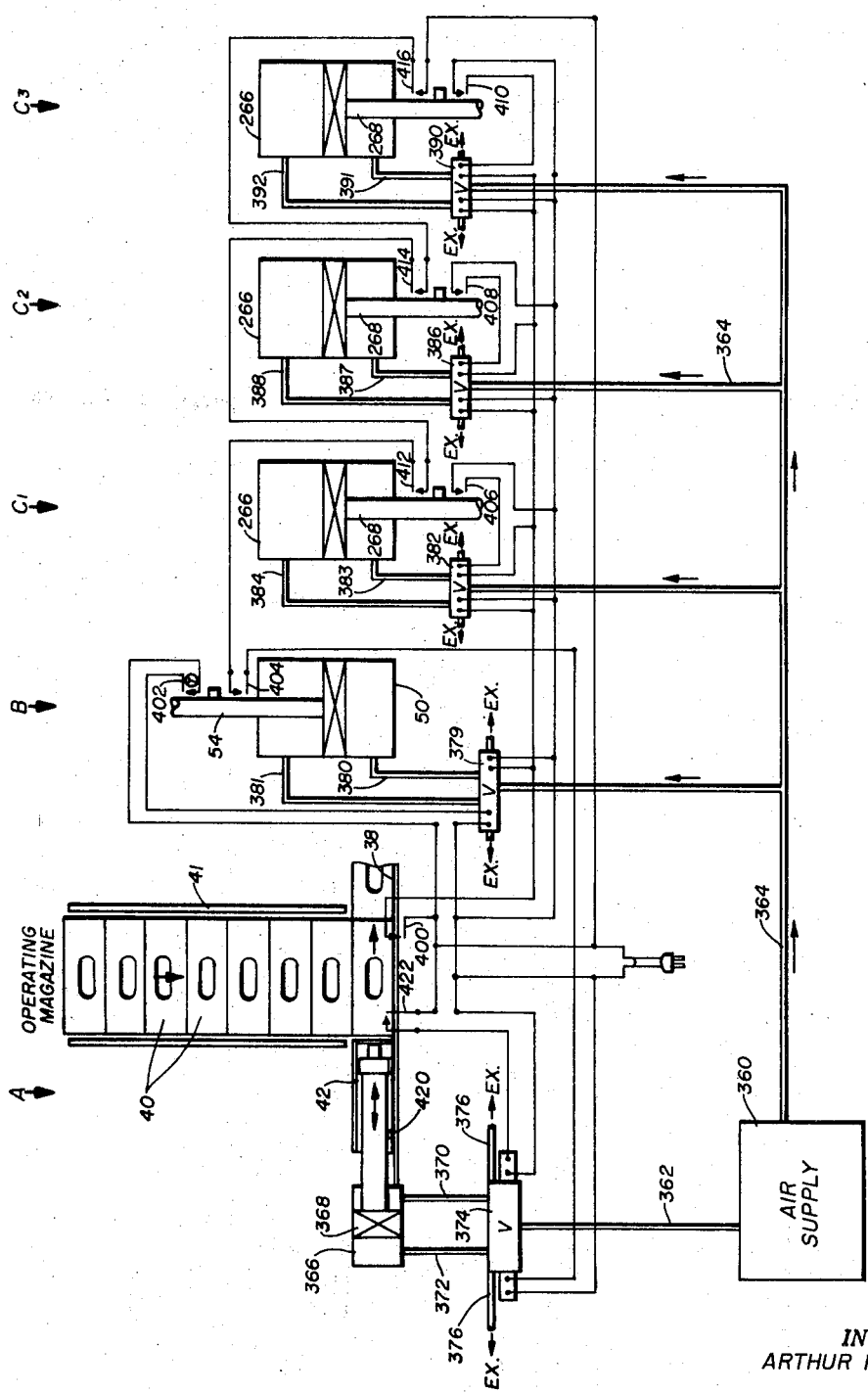
FIGURE 15 is a schematic diagram of the conveying and control operation of the invention.

The operation of the apparatus and methods of this invention is best described with reference to the various drawings and, in particular, FIGURE 15 which is a schematic of the electrical and pneumatic control system as preferably utilized. Unperforated molded beverage cases 40 are vertically aligned within the operating magazine 41 which is canted at the same angle with conveyor support plane 38. The pneumatic system incorporated with this invention includes the elements of a power fluid supply source 260 preferably compressed air and main outlet conduits 362 and 364. The outlet conduit 362 is operative with respect to the conveyor transfer piston 42 which includes a pneumatically operated cylinder 366 within which double acting piston 368 is operative from pneumatic supply lines 370 and 372 through valve 374 which is schematically shown as an electrically solenoid operated valve which, upon actuation, will one of either supply and/or exhaust pneumatic fluid to the operating cylinder and piston 366 and 368. Exhaust connections 376 are indicative of a common exhaust manifold, not shown, which can be connected to the air jets utilized to sweep the cuttings at the various stations. The outlet manifold 364 supplies pneumatic fluids to solenoid operated valves 379, 382, 386 and 390 for respective stations B, $C_1$ and $C_3$. Each of the solenoid operated valves is operatively connected to respective supply and/or exhaust conduits 380 and 381 to station B cylinder 50, 383 and 384 to station $C_1$ cylinder 266, 387 and 388 to $C_2$ and 391 and 392 to station $C_3$.

The beverage cases of this invention in a typical embodiment are obtained from a blow molding process requiring, on the top side thereof, twenty-four openings (for the beverage containers) approximately 27/16 inches in diameter. This operation occurs at station B described herein. Other holes are formed in the bottom of the case at stations $C_1$, $C_2$ and $C_3$. For example, station $C_1$ is adapted to drill twenty-four one-half inch diameter holes, whereas eighteen three-quarter inch holes are drilled at station $C_2$ while twenty three-sixteenth inch diameter holes are drilled at station $C_3$.

As previously described, the conveyor support plane 38 and the related equipment and mechanism at the various subsequent stations are canted rearwardly, preferably at an angle of about 15° off horizontal to provide ease of observation and maintenance through access doors 34 and/or 36, to assist in alignment of the beverage cases at the various stations, and to cause the routed and drilled chips from the beverage cases to gravitate rearwardly into scrap diversion funnel 106 and collection bin 108. In some instances, each station will be provided with a removable transparent protective member to prevent drilled or routed chips from flying toward the front of the machine and for safety purposes.

The router spindles 118 and attached collets 119 for holding router bits 120 are flange mounted to router orbiting plate 78 (FIGURE 5), while similar spindle 263, collets 265 and drill bits 264 (see FIGURE 13) are used at stations $C_1$, $C_2$ and $C_3$. The spindle r.p.m. will be set by the belt and sheave selection. In the typical embodiment, station B spindles will run at approximately 10,000 r.p.m. while the spindles at stations $C_1$, $C_2$ and $C_3$ will run at approximately 3,000 to 5,000 r.p.m. depending upon the diameter of the drill. Spindle drive motors 100 (station B) and motors 260 (stations $C_1$, $C_2$ and $C_3$) are preferably two horsepower, 3600 r.p.m. motor. At stations B and $C_1$ three of the above identified motors are utilized, each driving eight spindles using flat belts as shown. Station $C_2$ includes three of the above identified motors, each driving six spindles through flat belts whereas station $C_3$ utilizes two motors driving ten spindles through flat belts. The router bits 120 and drill bits 264 will be appropriately right-handed and left-handed in accordance with the spindle drive rotation hence eliminating the need of idler spindles.

The control station A will include a master switch, not shown, which will energize the motor circuit and various control devices and electrical circuits. Hence, the spindle for each of the stations and the orbiting drive mechanism 92, 94, and 96, will be operating continuously. Preferably, each of the stations will be performing its routing and/or drilling operation upon every other beverage case 40 with an intermediate case therebetween. Assuming, at this point, that beverage cases extend from the operating magazine 41 along conveyor plane 38 to the end guide 340, a complete cycle of operation begins when conveying transfer piston 42 has returned to that position shown in FIGURE 15 permitting the next beverage case 40 to drop onto conveyor plane 38 closing switch 400. This completes the circuit to actuate solenoid operated valves 379, 382, 386 and 390 simultaneously and hence actuate piston members 54 upward and 268 downwardly by permitting pressure fluid from manifold 364 through respective conduits 381, 384, 388, and 392 while pressure fluid is exhausted through respective conduits 380, 383, 387, and 391 into common exhaust 376.

Station B during the upward movement of piston guide rod 54 actuates a timer switch 402 in a fixed position until router orbiting plate 78 has had sufficient time to make one complete revolution.

As piston guide rod 54, at station B, moves upwardly, indexing plate 60 and end and side spaced indexing horns 70 attached thereto, move upwardly with respect to spring mounted conveyor plate 64, with the indexing horns passing through suitable openings 72 into tapered recesses which happen to be ornamentally formed as a part of beverage case 40, in this instance. This acts as a positioning and centering guide for the beverage case 40 as it likewise begins to move upwardly into contact with upper clamping plate 74 which include twenty-four openings, seventy-one flatly larger than the orbit to be traced by cutters 120 and as best shown in FIGURE 4 partially. Further movement extends the top of the beverage case into rotating routers 120 and slightly beyond. The router orbiting plate 78, attached spindles 118 and motors 100, and connected pulleys 110, belts 114 and the support frame 98 travel in an orbital path causing twenty-four openings simultaneously in the top of the beverage case. This occurs by the motor 96 driving speed reducer 92 through a sheave and belt mechanism 94 which in turn drives an endless chain 88 about its drive sprocket 130 and sprockets 82 located approximately at each corner of router orbiting plate 78 and best shown in FIGURE 7 as keyed to eccentric sleeve 102. Each eccentric sleeve 102 is adapted to rotate on bearings 152 and 154 about spindle 80 which is affixed to the router mounting plate 76 by fasteners 140. At the end of the given time, switch 402 will close actuating solenoid valve member 379 to a reverse position whereby pressure fluid is supplied into conduit 381 by communication with pressure fluid from manifold 364 while pressure fluid is exhausted on the other side from conduits 380 and 376. At the end of the return stroke, switch 404 is closed.

Stations C₁, C₂ and C₃, operate substantially identical. That is, on the closing of switch 400, solenoid valves 382, 386, and 390 operate to supply pressure fluid from conduit 364 into respective conduits 383, 387, and 391 while exhausting pressure fluid from the other side of the piston in conduits 384, 388 and 392 into a common exhaust 376. This movement draws clamping plate 280 into abutment with case 40 against conveyor plate 286 which is spring mounted with respect to mounting plate 290 forcing indexing horns 292 into the recesses of beverage case 40 as previously described. Further continued movement of the piston brings the bottom of beverage case 40 into contact and slightly into the plane of rotating drills 264 which are appropriately located and of diameter and size as required. Upon reaching the bottom of the stroke, switches 406, 408 and 410 are closed respectively reversing solenoid operating valves 382, 386 and 390 to reverse the flow of pressure fluid returning pistons 268 to their initial position closing respective switches 412, 414 and 416. Upon the closing of switches 404, 412, 414 and 416, all of which are in series of each other, a completed circuit will exist with respect to operating piston solenoid valve 374 which will act to cause pressure fluid from conduit 362 to communicate with conduit 372 into cylinder 366 forcing piston 368 and attached conveyor transfer piston 42 to the right one stroke, hence transferring the next beverage case one full position to the right along conveyor plane 38, hence positioning the next adjacent beverage case 40 opposite the respective stations. At the end of the stroke means 420 will close switch 422 reversing solenoid valve 374 wherein pressure supply fluid is caused to communicate with conduit 370 while pressure fluid is exhausting through conduits 372 and 376 returning conveyor transfer piston 40 back to its originating position. Once returned, the next vertically spaced beverage case 40 drops onto conveyor plane 38 closing switch 400 wherein the cycle is repeated.

This invention, the apparatus and mode of operation has been described herein with respect to specific embodiments. However, the invention is not to be limited thereto, as other modifications will become readily apparent to those skilled in the art, yet will fall within the limitations set forth in the following claim.

What is claimed:
1. Apparatus for selectively causing a desired orbital movement of a plate comprising
   a support base;
   a plurality of eccentric members rotatably supported to said base, each of said eccentrics including:
   (1) an eccentric sleeve rotatably supported on said base,
   (2) a first cam shoe attachable and rotatable with said eccentric sleeve,
   (3) a second cam shoe radially movable relative to said eccentric sleeve, rotatably with said first cam shoe and spaced therefrom, and
   (4) spring means normally biasing said second cam shoe radially outward from said first cam shoe;
   said plate supported by said eccentrics for relative movement therewith;
   at least one tracing cam removably attached to said support base and having an opening therein representative of said desired path;
   a follower attached to said orbital plate juxtapositioned in said tracing cam opening; and
   means to simultaneously rotate said eccentric members.

References Cited
UNITED STATES PATENTS

| 1,624,648 | 4/1927 | Aldeen | 77—5 |
| 1,752,468 | 4/1930 | Stull | 77—5 |
| 1,777,286 | 10/1930 | Aldeen | 144—69 |
| 3,211,061 | 10/1965 | Cretsinger | 90—13.1 |

RICHARD H. EANES, JR., *Primary Examiner.*